Figure 1:
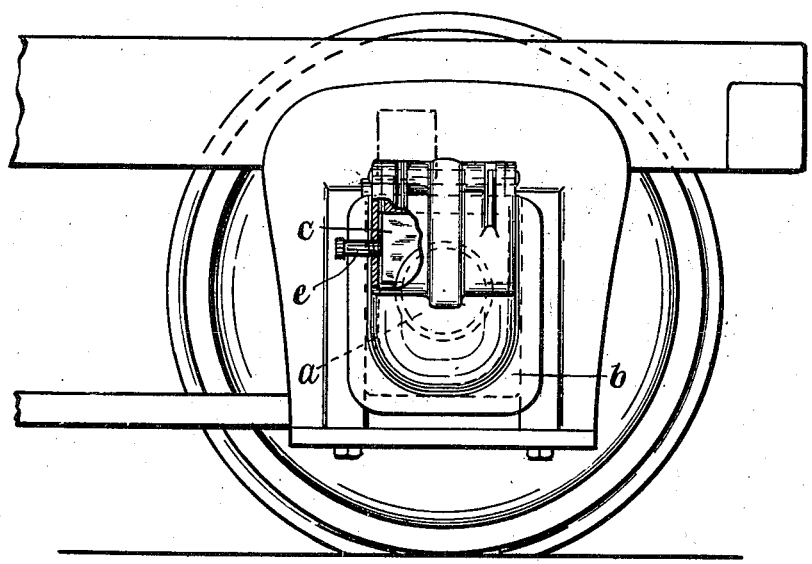

Apr. 10, 1923.  1,451,044

J. P. LEONARD

DEVICE FOR DETECTING OVERHEATED BEARINGS

Filed Nov. 5, 1921

WITNESS

Wm L. Bell

INVENTOR,
Joseph P. Leonard,
BY
John Stewart
ATTORNEY

Patented Apr. 10, 1923.

1,451,044

UNITED STATES PATENT OFFICE.

JOSEPH P. LEONARD, OF PATERSON, NEW JERSEY.

DEVICE FOR DETECTING OVERHEATED BEARINGS.

Application filed November 5, 1921. Serial No. 513,103.

*To all whom it may concern:*

Be it known that I, JOSEPH P. LEONARD, a citizen of the United States, residing at Paterson, in the county of Passaic and State of New Jersey, have invented certain new and useful Improvements in Devices for Detecting Overheated Bearings, of which the following is a specification.

The object of this invention is to provide means for protecting a bearing against overheating as the result of dissipation of the lubricant. According to the invention in its best form a hollow holder is provided which may be screwed into the part subject to overheating, as the journal box, and has at its inner end a fusible member which normally prevents release of a lubricant mass contained in the holder and urged toward the said end of the holder by a spring and which member further normally restrains a spring-pressed signal device against moving and so giving notice that the bearing needs to be re-supplied with lubricant; in such best form of the invention the lubricant mass is preferably in the form of a solid capable of melting when the temperature becomes sufficient to fuse said fusible member, so that thereupon in liquid form the lubricant will run into the bearing.

The drawing shows, in

Figure 3:
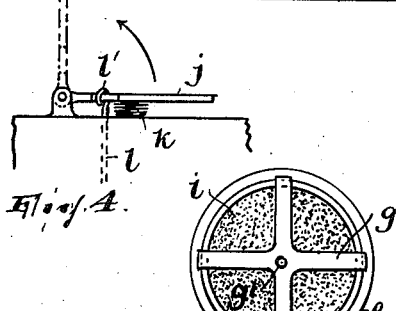
Figure 3:
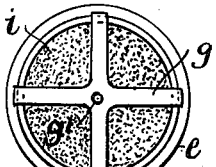
Figure 2:
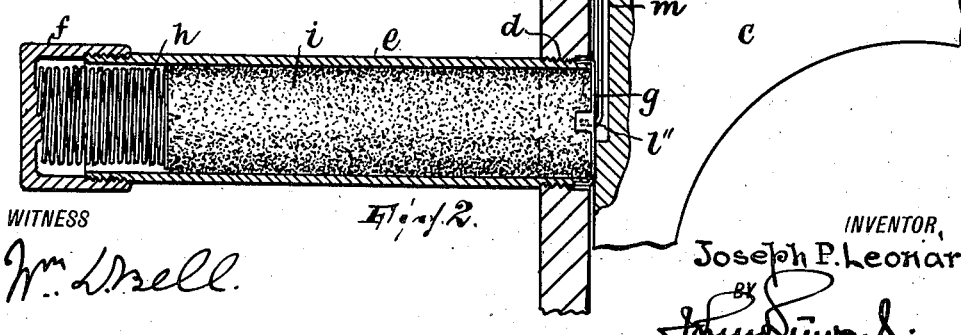

Figure 1, car-bearing equipped with the improved protecting means;

Figure 2, a sectional view of the bearing and protecting means on a larger scale; and Figures 3 and 4, details.

The car-bearing shown is of usual form, *a* being the axle, *b* the box, and *c* the brass, which rests on the axle and is contained in the box; the box as usual affords space below the axle for waste to contain the lubricant, which is usually applied to the box in liquid form. The present invention is intended to function when this, the regular lubricant, is exhausted.

The box is formed, preferably at a lateral point, with a threaded hole *d* into which is screwed the threaded end of a cylindrical hollow holder *e* whose opposite end has screwed thereon a cap *f;* but the holder may be closed outwardly or otherwise provided with an outward abutment (which cap *f* constitutes) in any other way. The inner end of the holder is exteriorly reduced and thereon are clinched the inturned ends of the arms of a cross-shaped fusible metallic member *g*, such reducing being provided for so that after clinching the member *g* in place the holder may be screwed into hole *d*. Against the abutment *f* bears a helical spring *h* and against the spring and held between it (the latter being in compression) and the member *g* is a plug of solid grease *i*, adapted to melt or fuse and assume liquid form under a temperature sufficient to fuse the member *g*.

When the temperature of the bearing reaches that degree which will cause fusing of member *g*, the then unrestrained plug *i* will be forced by the spring inward, melting away at its inner end, the liquid product (liquid lubricant) resulting from the melting running down into the box to be supplied to the bearing by the capillary action of the waste present therein, or in any other way; the spring is adapted to relax sufficiently to keep the inner end of the plug up to its work, so that it will finally all be melted away. By providing in this way for automatic replenishment of lubricant a car bearing or the like can be protected against overheating if the regular lubricant becomes exhausted between stopping stages.

It will be understood that the device *g* is in itself an indicator: its presence or absence, upon removing the holder *e* therefor from the bearing, will reveal whether or not, respectively, overheating (that is to say, exhaustion of the regular lubricant) has occurred, which in certain classes of bearings could not be ascertained otherwise, or at least as readily as by simply removal and inspection of said holder *e*.

But I prefer to provide signal means which will indicate the overheating exteriorly. On the top of the box is fulcrumed a plate *j* whose fulcrum is arranged at right angles to the line of sight by which the bearing is usually observed, the plate being adapted to swing down to a horizontal plane so as to stand edgewise to the observer. In this position it compresses a lifting spring *k*, so that it is normally moved by the spring to the former of these positions, and it is held in said horizontal position by a link shown as a wire *l* having at one end an eye *l'*, engaged in a hole in the plate and the other bent off at right angles to form a hook *l''* which enters a hole *g'* in the member *g*. The bearing may be suitably apertured, as at *m*, to receive said link. When the member *g* fuses and so releases the link and plate the latter assumes the upright position. The face thereof then presented to the observer (the one normally down) may be given some striking color, as white or red. The arrangement is such that when the signal device *j* has been operated due to fusing of member *g*, upon removal of the holder and fitting the same with a new member *g* and then screwing the holder back into the hole *d* the end or catch *l″* of the link can be readily made to enter the hole *g′* of said member, said hole for this purpose being placed in the longitudinal axis of the holder. The member *g* may be sheet material, but due to the pull of the link *l* being in a plane parallel therewith it resists any tendency to become distorted or detached from the holder.

Having thus fully described my invention, what I claim as new and desire to secure by Letters Patent is:

1. In combination, with a bearing, signal means normally moved to display position and having a catch, and a controller for the signal means including a holder on the bearing and a fusible member on the holder having the catch removably connected thereto and thereby resisting movement of the signal means.

2. In combination, with a support, normally moved signal means on the support, and a plate-like fusible member on the support arranged in a plane substantially parallel with the plane of movement of the signal means, and having the latter embedded therein and thereby resisting movement of the signal means.

In testimony whereof I affix my signature.

JOSEPH P. LEONARD.